United States Patent
Speller et al.

(10) Patent No.: US 10,875,640 B2
(45) Date of Patent: Dec. 29, 2020

(54) MAST LOCKOUT SYSTEMS FOR TILTROTOR AIRCRAFT

(71) Applicant: Textron Innovations Inc., Providence, RI (US)

(72) Inventors: Charles Hubert Speller, Flower Mound, TX (US); Troy Cyril Schank, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 556 days.

(21) Appl. No.: 15/897,310

(22) Filed: Feb. 15, 2018

(65) Prior Publication Data

US 2019/0248481 A1 Aug. 15, 2019

(51) Int. Cl.
*B64C 27/50* (2006.01)
*B64C 29/00* (2006.01)

(52) U.S. Cl.
CPC .......... *B64C 27/50* (2013.01); *B64C 29/0033* (2013.01)

(58) Field of Classification Search
CPC ..... B64C 27/50; B64C 29/0033; B64C 11/28; B64D 27/14; B64D 35/00
See application file for complete search history.

(56) References Cited

U.S. PATENT DOCUMENTS

| 3,528,630 A | 9/1970 | Ferris et al. |
| 3,592,412 A * | 7/1971 | Glatfelter ............ B64C 29/0033 244/7 A |
| 6,622,962 B1 | 9/2003 | White |
| 8,998,125 B2 * | 4/2015 | Hollimon ............ B64C 29/0033 244/7 A |
| 2016/0152329 A1 | 6/2016 | Tzeng et al. |
| 2017/0144746 A1 * | 5/2017 | Schank ............... B64C 29/0033 |
| 2019/0016451 A1 * | 1/2019 | Ehinger .................... F02C 7/36 |

* cited by examiner

*Primary Examiner* — Justin M Benedik
(74) *Attorney, Agent, or Firm* — Lawrence Youst PLLC

(57) ABSTRACT

A mast lockout system for a tiltrotor aircraft having a proprotor assembly. The system includes a mast coupled to and rotatable with the proprotor assembly. A proprotor gearbox having a proprotor gearbox housing is operable to transmit torque and rotation energy to the mast. A lock assembly has first and second lock members. The first lock member is coupled to and rotatable with the mast. The second lock member is coupled to the proprotor gearbox housing. The lock assembly has a first position in which the first and second lock members are disengaged, thereby allowing rotation of the proprotor assembly. The lock assembly has a second position in which the first and second lock members are engaged, thereby preventing rotation of the proprotor assembly. The lock assembly is actuatable between the first and second positions.

20 Claims, 6 Drawing Sheets

MAST LOCKOUT SYSTEMS FOR TILTROTOR AIRCRAFT

TECHNICAL FIELD OF THE DISCLOSURE

The present disclosure relates, in general, to tiltrotor aircraft having rotary and non rotary flight modes and, in particular, to mast lockout systems for tiltrotor aircraft operable to prevent rotation of the proprotor assemblies and align the proprotor blades for folding during the non rotary flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

SUMMARY

In a first aspect, the present disclosure is directed to a mast lockout system for a tiltrotor aircraft having a proprotor assembly. The system includes a mast coupled to and rotatable with the proprotor assembly. A proprotor gearbox having a proprotor gearbox housing is operable to transmit torque and rotation energy to the mast. A lock assembly has first and second lock members. The first lock member is coupled to and rotatable with the mast. The second lock member is coupled to the proprotor gearbox housing. The lock assembly has a first position in which the first and second lock members are disengaged, thereby allowing rotation of the proprotor assembly. The lock assembly has a second position in which the first and second lock members are engaged, thereby preventing rotation of the proprotor assembly. The lock assembly is actuatable between the first and second positions.

In some embodiments, the lock assembly may include a piston that is actuatable to shift the lock assembly between the first and second positions. In such embodiments, the piston may be a hydraulically actuated piston. In certain embodiments, the first lock member may be coupled to the exterior of the mast. In some embodiments, the first lock member may be coupled to the mast by a splined connection to prevent relative rotation therebetween. In certain embodiments, the first lock member may include a collar assembly that is coupled to the mast and at least one lock pin coupled to and radially outwardly extending from the collar assembly. In some embodiments, a radial bearing may be coupled to the lock pin. In certain embodiments, the first lock member may include at least two oppositely disposed lock pins, each of which may have a radial bearing coupled thereto.

In some embodiments, the second lock member may be coupled to the exterior of the proprotor gearbox housing. In certain embodiments, the second lock member may include a generally cylindrical inner piston housing and a generally cylindrical outer piston housing having a generally cylindrical piston disposed therebetween. In some embodiments, the piston may have at least one v-block operable to receive and align at least a portion of the first lock member therein. In certain embodiments, the piston may have at least two oppositely disposed v-blocks each operable to receive and align at least a portion of the first lock member therein. In some embodiments, a generally cylindrical guide may be coupled to the proprotor gearbox housing and disposed within the second lock member. In such embodiments, the piston may be coupled to the guide by a splined connection to prevent relative rotation therebetween. In certain embodiments, the piston may define first and second chambers with the inner and outer piston housings. In such embodiments, the first and second chambers may be operable to receive and discharge a fluid to actuate the piston, thereby shifting the lock assembly between the first and second positions.

In a second aspect, the present disclosure is directed to a mast lockout system for a tiltrotor aircraft having a proprotor assembly. The system includes a mast coupled to and rotatable with the proprotor assembly. A proprotor gearbox having a proprotor gearbox housing is operable to transmit torque and rotation energy to the mast. A first lock member includes a collar assembly rotatable with and coupled to an exterior of the mast and at least one lock pin radially outwardly extending therefrom. A second lock member includes a generally cylindrical inner piston housing and a generally cylindrical outer piston housing having a generally cylindrical piston disposed therebetween. The inner and outer piston housings are coupled to an exterior of the proprotor gearbox housing. The piston has at least one v-block. The second lock member has a first position in which the first and second lock members are disengaged, thereby allowing rotation of the proprotor assembly. The second lock member has a second position in which the lock pin of the first lock member is received within and aligned by the v-block of the second lock member, thereby preventing rotation of the proprotor assembly. The piston is hydraulically actuatable to shift the second lock member between the first and second positions.

In some embodiments, the lock pin may be operable to slide against the v-block as the second lock member engages the first lock member to rotationally clock the proprotor assembly. In certain embodiments, a radial bearing may be coupled to the lock pin such that the radial bearing is operable to rotate against the v-block as the second lock member engages the first lock member to rotationally clock the proprotor assembly. In some embodiments, the first lock member may include at least two oppositely disposed lock pins and the second lock member may include at least two oppositely disposed v-blocks each operable to receive and align one of the lock pins. In certain embodiments, a radial bearing may coupled to each of the lock pins such that each of the radial bearings is operable to rotate against one of the v-blocks as the second lock member engages the first lock member to rotationally clock the proprotor assembly.

In a third aspect, the present disclosure is directed to a tiltrotor aircraft having rotary and non rotary flight modes. In the rotary flight mode, the tiltrotor aircraft operates at least two proprotor assemblies each having a plurality of proprotor blades. In the non rotary flight mode, the proprotor assemblies are rotationally locked and rotationally clocked for folding of the proprotor blades. For each proprotor assembly, the aircraft includes a mast coupled to and rotatable with the proprotor assembly. A proprotor gearbox having a proprotor gearbox housing is operable to transmit torque and rotation energy to the mast. A lock assembly has first and second lock members. The first lock member is coupled to and rotatable with the mast. The second lock member is coupled to the proprotor gearbox housing. The lock assembly has a first position in which the first and second lock members are disengaged, thereby allowing rotation of the proprotor assembly. The lock assembly has a second position in which the first and second lock members are engaged, thereby preventing rotation of the proprotor assembly. The lock assembly is actuatable between the first and second positions.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
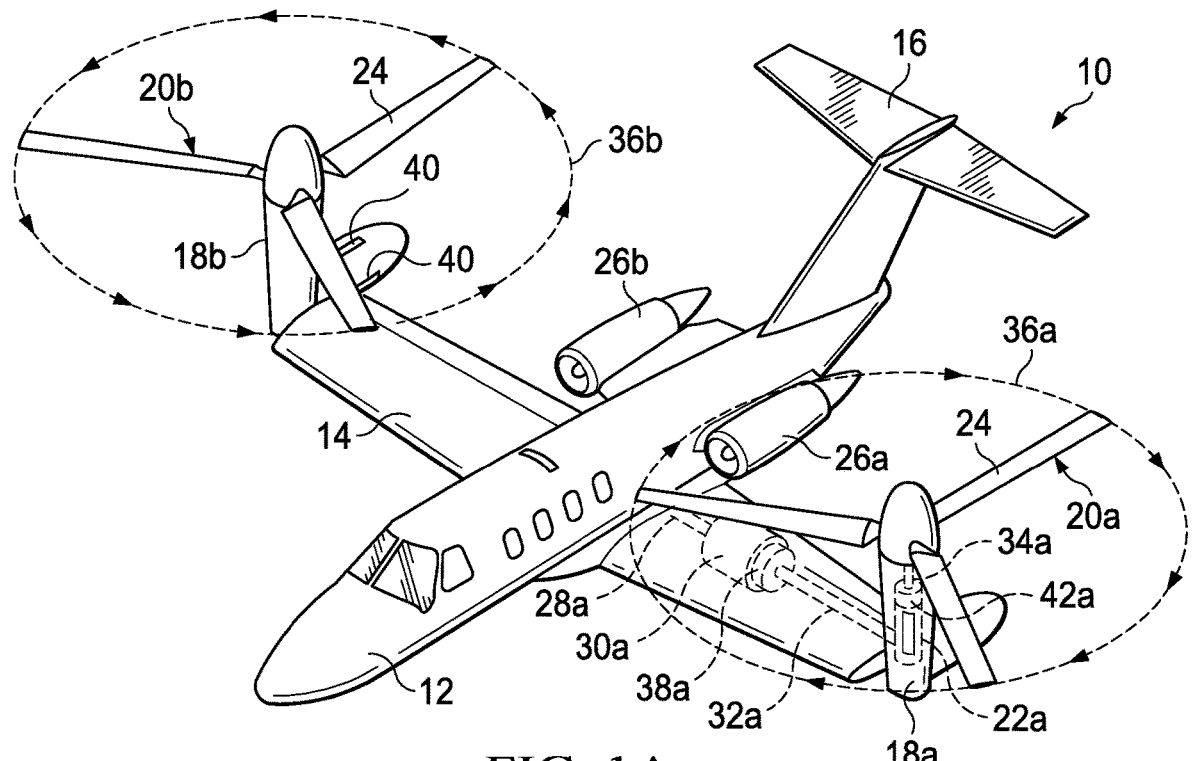
FIGS. 1A-1D are schematic illustrations of a tiltrotor aircraft in various flight modes in accordance with embodiments of the present disclosure.
Figure 1B:
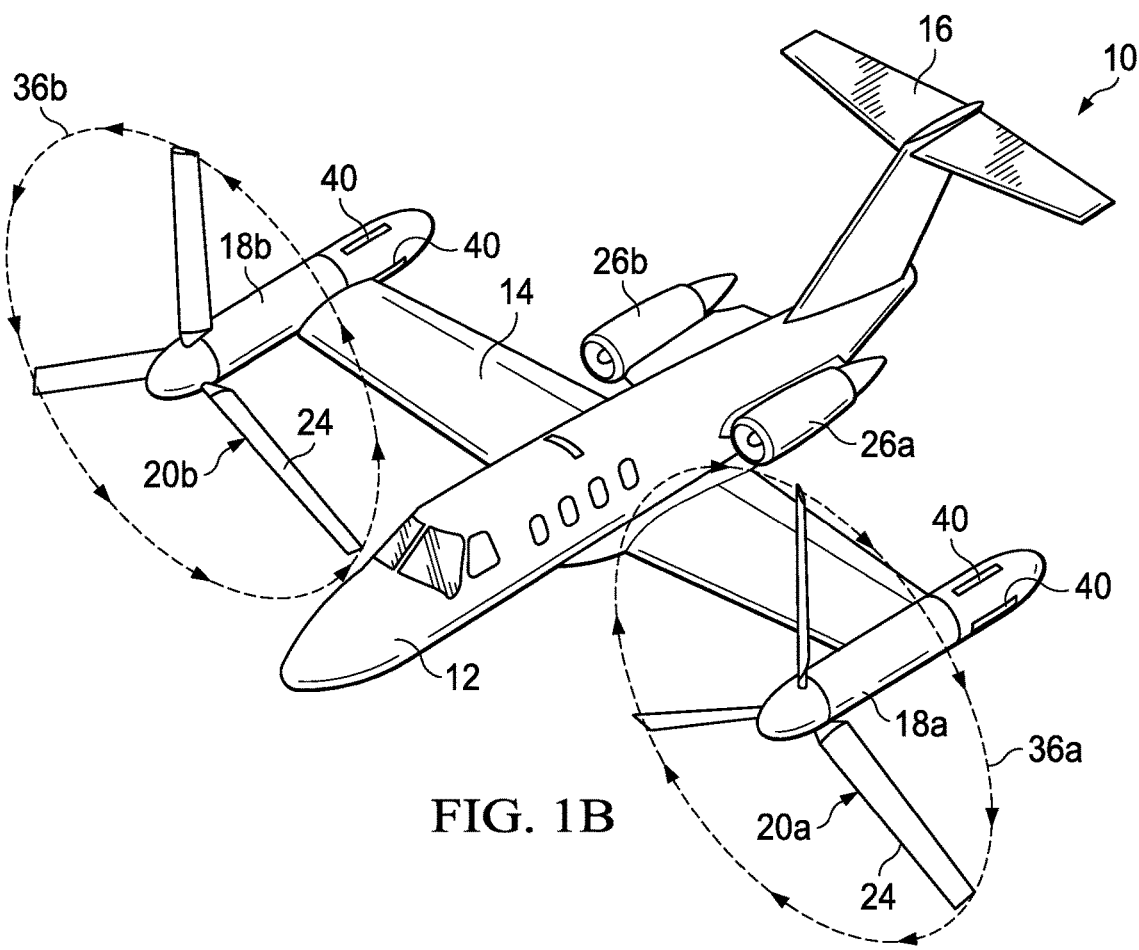
Figure 1C:
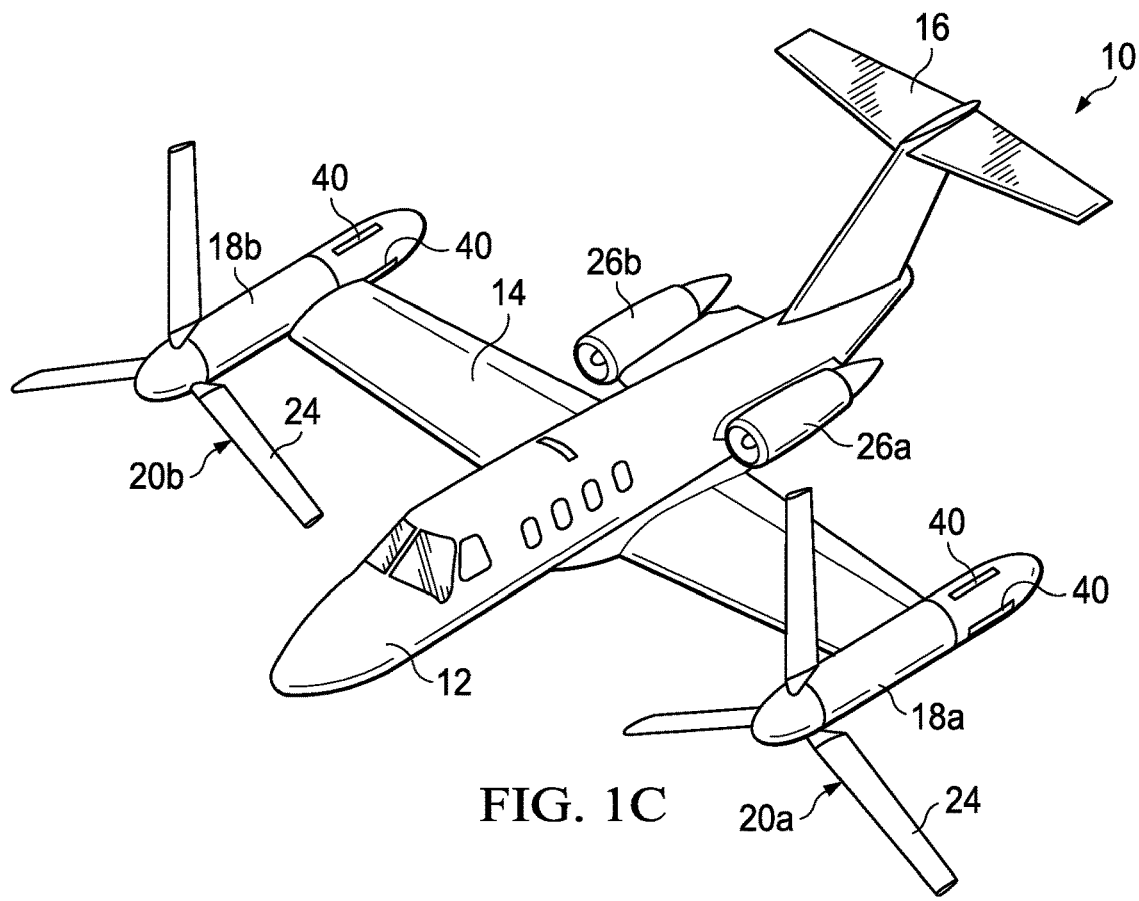
Figure 1D:
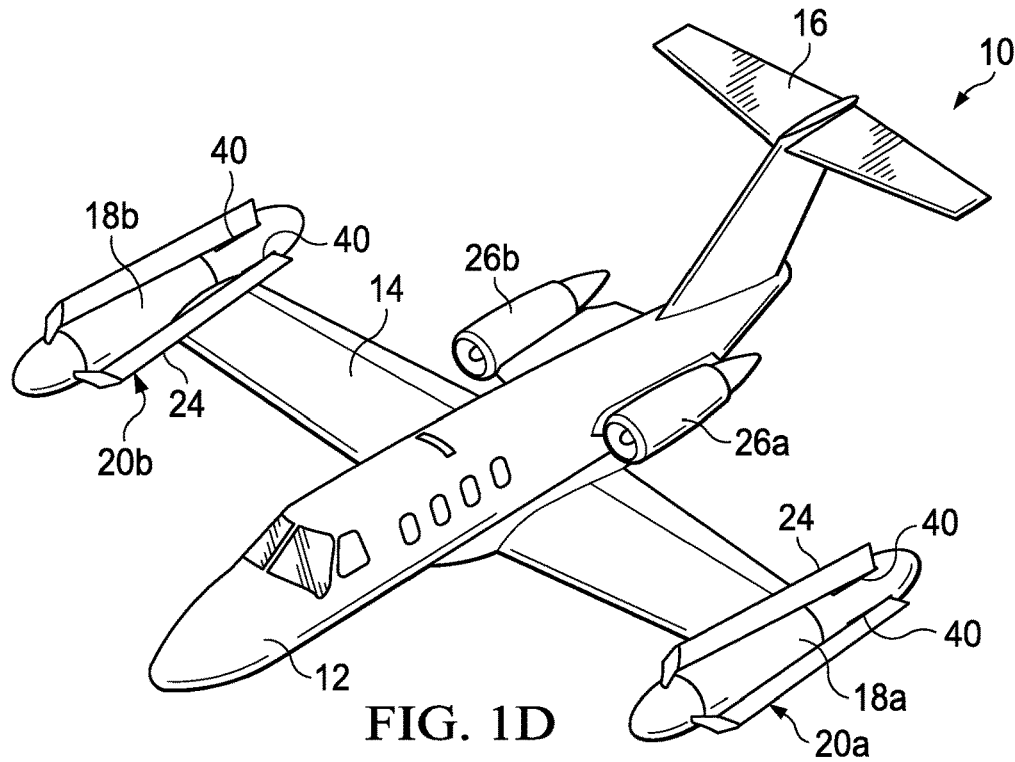

Referring to FIGS. 1A-1D in the drawings, a tiltrotor aircraft is schematically illustrated and generally designated 10. Aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. For example, a proprotor gearbox 22a is housed within pylon assembly 18a. Each proprotor gearbox includes a proprotor gearbox housing and a plurality of gears, such as planetary gears, used to adjust the engine output to a suitable rotational speed so that the engines and the proprotor assemblies may rotate at optimum speeds in rotary flight modes of aircraft 10.

Each proprotor assembly 20a, 20b includes a plurality of proprotor blades 24 that are operable to be rotated, as best seen in FIGS. 1A-1B, operable to be feathered, stopped, clocked and locked, as best seen in FIG. 1C and operable to be folded, as best seen in FIG. 1D. In the illustrated embodiment, proprotor assembly 20a is rotated responsive to torque and rotational energy provided by engine 26a via input shaft 28a, mid-wing gearbox 30a, output shaft 32a, proprotor gearbox 22a and mast 34a. Similarly, proprotor assembly 20b is rotated responsive to torque and rotational energy provided by engine 26b via an input shaft, a mid-wing gearbox, an output shaft, a proprotor gearbox and a mast (not pictured). Engines 26a, 26b are located along an aft portion of fuselage 12. Engines 26a, 26b are operable in a turboshaft mode, as best seen in FIGS. 1A-1B and a turbofan mode, as best seen in FIGS. 1C-1D.

FIG. 1A illustrates aircraft 10 in VTOL or helicopter flight mode, in which proprotor assemblies 20a, 20b are rotating in a substantially horizontal plane to provide a vertical lift, such that aircraft 10 flies much like a conventional helicopter. In this configuration, engines 26a, 26b are operable in turboshaft mode wherein hot combustion gases in each engine 26a, 26b cause rotation of a power turbine coupled to a respective input shaft of a mid-wing gearbox that powers a respective proprotor assemblies 20a, 20b. Thus, in this configuration, aircraft 10 is considered to be in a rotary flight mode as proprotor assemblies 20a, 20b are providing thrust for aircraft 10. FIG. 1B illustrates aircraft 10 in proprotor forward flight mode, in which proprotor assemblies 20a, 20b are rotating in a substantially vertical plane to provide a forward thrust enabling wing 14 to provide a lifting force responsive to forward airspeed, such that aircraft 10 flies much like a conventional propeller driven aircraft. In this configuration, engines 26a, 26b are operable in the turboshaft mode and aircraft 10 is considered to be in the rotary flight mode.

In the rotary flight mode of aircraft 10, proprotor assemblies 20a, 20b rotate in opposite directions to provide torque balancing to aircraft 10. For example, when viewed from the front of aircraft 10 in proprotor forward flight mode (FIG. 1B) or from the top in helicopter mode (FIG. 1A), proprotor assembly 20a rotates clockwise, as indicated by motion arrows 36a, and proprotor assembly 20b rotates counterclockwise, as indicated by motion arrows 36b. In the illustrated embodiment, proprotor assemblies 20a, 20b each include three proprotor blades 24 that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that aircraft 10 can be operated such that proprotor assemblies 20a, 20b are selectively positioned between proprotor forward flight mode and helicopter mode, which can be referred to as a conversion flight mode.

FIG. 1C illustrates aircraft 10 in transition between proprotor forward flight mode and airplane forward flight mode, in which engines 26a, 26b have been disengaged from proprotor assemblies 20a, 20b and proprotor blades 24 have been feathered, or oriented to be streamlined in the direction of flight, such that proprotor blades 24 act as brakes to aerodynamically slow the rotation of proprotor assemblies 20a, 20b. In the illustrated embodiment, the rotation of proprotor assemblies 20a, 20b is stopped using, for example, brake systems positioned within wing 14, only brake system 38a being visible in FIG. 1A. Preferably, the brake systems include position sensors such that the output shafts can be stopped at predetermined rotational positions. By stopping the output shafts in known rotational positions, the rotational positions of proprotor assemblies 20a, 20b is also known. This rotational clocking of proprotor blades 24 is important to prevent contact with wing 14 and to align each proprotor blade 24 with a respective slot 40 in pylon assemblies 18a, 18b for folding.

Due to the distance between the brake systems and proprotor assemblies 20a, 20b as well as the gear systems therebetween, use of the position sensors results in coarse rotational clocking of proprotor assemblies 20a, 20b. Once proprotor assemblies 20a, 20b have stopped and have been coarsely rotationally clocked, the mast lockout systems of the present disclosure are engaged to lock proprotor assemblies 20a, 20b against rotation and to precisely rotationally clock proprotor assemblies 20a, 20b such that each proprotor blade 24 will be aligned with a slot 40 for folding. Mast lockout system 42a is visible in FIG. 1A. In the illustrated configuration of aircraft 10 in FIG. 1C, engines 26a, 26b are operable in turbofan mode wherein hot combustion gases in each engine 26a, 26b cause rotation of a power turbine coupled to an output shaft that is used to power a turbofan that forces bypass air through a fan duct to create forward thrust enabling wing 14 to provide a lifting force responsive to forward airspeed, such that aircraft 10 flies much like a conventional jet aircraft. In this configuration, aircraft 10 is considered to be in a non rotary flight mode as proprotor assemblies 20a, 20b are no longer providing thrust for aircraft 10.

FIG. 1D illustrates aircraft 10 in high speed, airplane forward flight mode, in which proprotor blades 24 have been folded to be oriented substantially parallel to respective pylon assemblies 18a, 18b to minimize the drag force generated by proprotor blades 24. To prevent chatter or other movement of proprotor blades 24 when folded, proprotor blades 24 are preferably received within slots 40 of pylon assemblies 18a, 18b. In this configuration, engines 26a, 26b are operable in the turbofan mode and aircraft 10 is considered to be in the non rotary flight mode. The forward cruising speed of aircraft 10 can be significantly higher in airplane forward flight mode versus proprotor forward flight mode as the forward airspeed induced proprotor aeroelastic instability is overcome.

Even though aircraft 10 has been described as having two engines fixed to the fuselage each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies having mast lockout systems are illustrated in the context of tiltrotor aircraft 10, it should be understood by those having ordinary skill in the art that the proprotor assemblies having mast lockout systems disclosed herein can be implemented on other tiltrotor aircraft including, for example, quad tiltrotor aircraft having an additional wing member aft of wing 14, unmanned tiltrotor aircraft or other tiltrotor aircraft configurations.

Figure 2A:
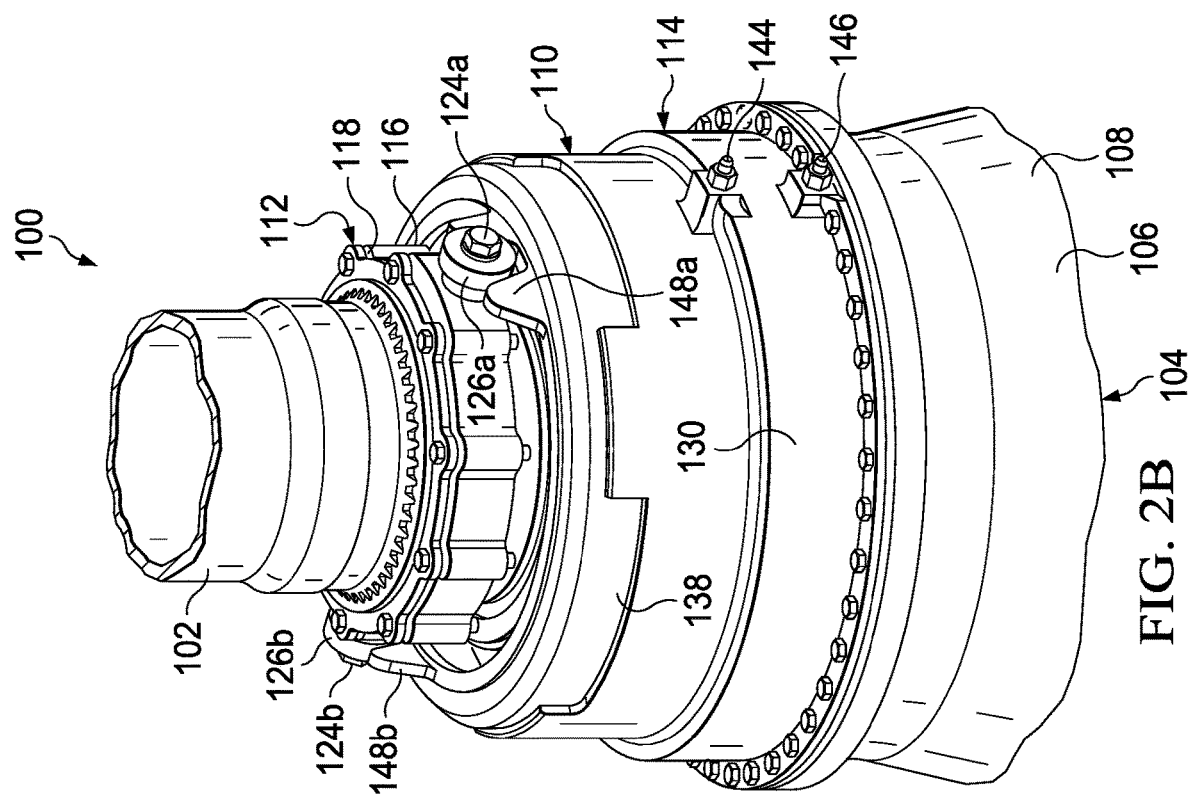
FIGS. 2A-2B are isometric views of a mast lockout system for a tiltrotor aircraft in disengaged and engaged positions in accordance with embodiments of the present disclosure.
Figure 2B:
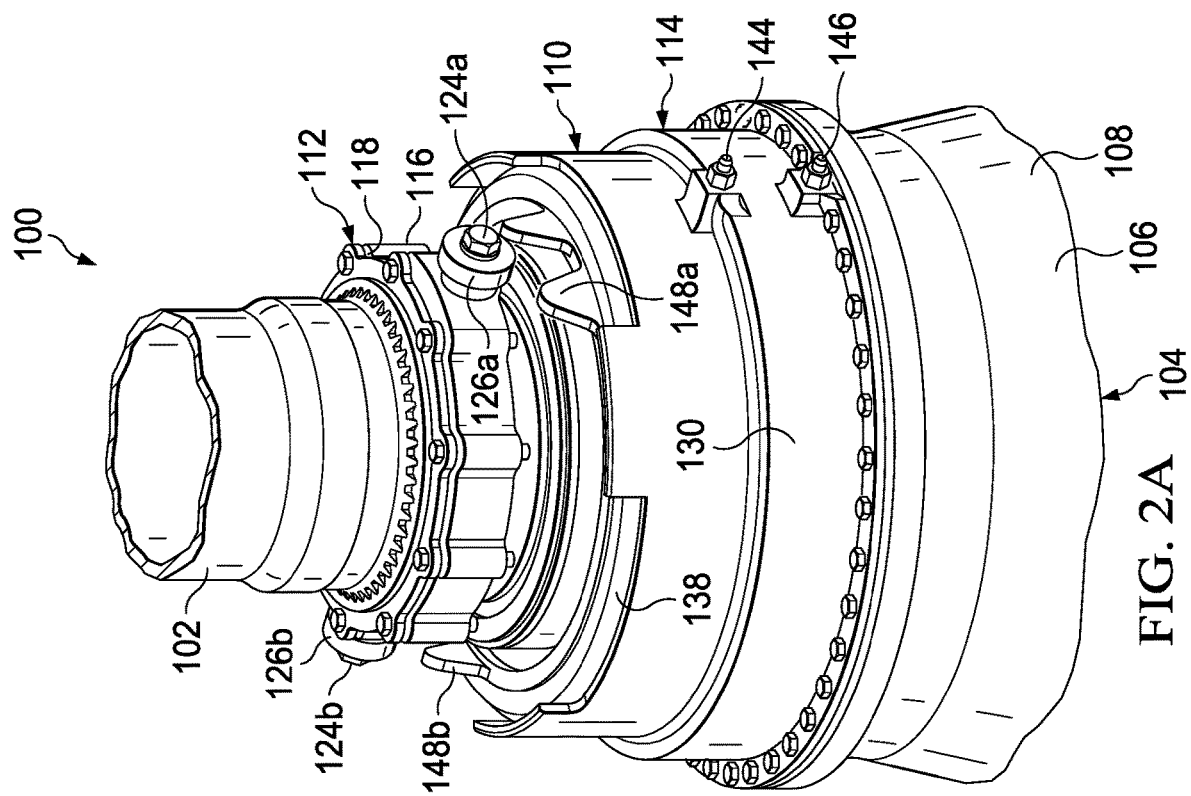
Figure 2C:
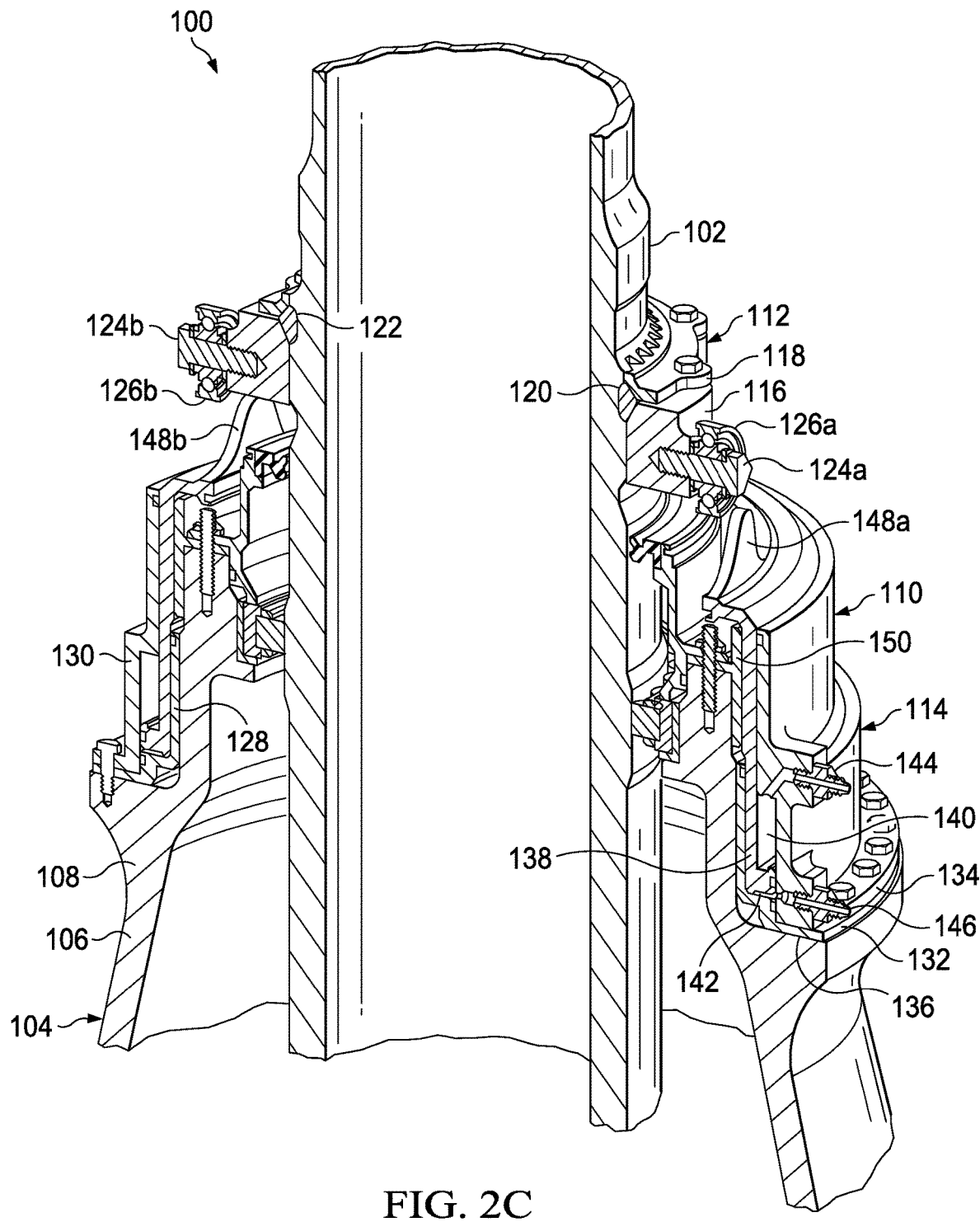
FIG. 2C is a cross sectional view of a mast lockout system for a tiltrotor aircraft in accordance with embodiments of the present disclosure.

Referring to FIGS. 2A-2C of the drawings, a mast lockout system for a tiltrotor aircraft is generally designated 100. In the illustrated embodiment, mast lockout system 100 includes a mast 102 that receives torque and rotational energy from an engine, such as engines 26a, 26b, discussed herein, via a drivetrain including a proprotor gearbox 104. Proprotor gearbox 104 includes an outer housing 106 that is coupled to the airframe of aircraft 10. In the illustrated embodiment, the upper case 108 of outer housing 106 is depicted. Mast 102 supplies torque and rotational energy to a proprotor assembly, such as proprotor assemblies 20a, 20b discussed herein. As such, mast 102 rotates with the associated proprotor assembly. Mast lockout system 100 includes a lock assembly 110 having a rotating lock member 112 and a fixed lock member 114. Rotating lock member 112 includes a collar assembly 116 that is coupled to the exterior of mast 102. Collar assembly 116 is secured against axial movement relative to mast 102 by flange 118 that secures a ring 120 within a groove 122 of mast 102. Flange 118 and collar assembly 116 are coupled to mast 102 at a splined connection to prevent relative rotation therebetween. Thus, rotating lock member 112 rotates with mast 102. In the illustrated embodiment, rotating lock member 112 includes two oppositely disposed lock pins 124a, 124b that are threadably coupled to collar assembly 116 and extend radially outwardly therefrom. In the illustrated embodiment, optional radial bearings 126a, 126b are positioned on lock pins 124a, 124b, respectively. Radial bearings 126a, 126b are preferably radial ball bearing assemblies that have outer races that are operable for rotation about the respective lock pins 124a, 124b.

Fixed lock member 114 includes a generally cylindrical inner piston housing 128 and a generally cylindrical outer piston housing 130. As used herein, the term "generally cylindrical" refers to a part that has a cylindrical component with or without an internal or external stepped profile and with or without addition non cylindrical features. In the illustrated embodiment, inner piston housing 128 includes a flared portion 132 having a plurality of bolt holes. Likewise, outer piston housing 130 includes a flared portion 134 having a plurality of bolt holes. Inner piston housing 128 and outer piston housing 130 are secured to an upper surface 136 of upper case 108 by a plurality of bolts. A generally cylindrical piston 138 is at least partially disposed between inner piston housing 128 and outer piston housing 130. Piston 138 defines an upper chamber 140 and a lower chamber 142 with inner piston housing 128 and outer piston housing 130. At least one hydraulic valve 144 is in fluid communication with upper chamber 140 and at least one hydraulic valve 146 is in fluid communication with lower chamber 142. In the illustrated embodiment, piston 138 includes two oppositely disposed v-blocks 148a, 148b. Fixed lock member 114 includes a generally cylindrical guide 150 that is securably coupled to upper case 108 with a plurality of bolts. Piston 138 is coupled to guide 150 by a splined connection to prevent relative rotation therebetween. The splined connection, however, allows for axial movement of piston 138 relative to guide 150.

The operation of mast lockout system 100 will now be described. When it is desired to transition aircraft 10 from the proprotor forward flight mode to the airplane forward flight mode, the engines are disengaged from the proprotor assemblies and the proprotor blades are feathered for aerodynamic braking. The brake system may then be engaged to fully stop the rotation of the proprotor assemblies. As discussed herein, the braking systems may incorporate position sensors to provide coarse rotational clocking of the proprotor blades. The coarse rotational clocking has a tolerance that is sufficient to circumferentially align lock pins 124a, 124b within the open ends of v-blocks 148a, 148b, as best seen in FIG. 2A, which represents the disengaged position of mast lockout system 100. When mast lockout system 100 is in the disengaged position, hydraulic fluid enters lower chamber 142 via hydraulic valve 146 and exits upper chamber 140 via hydraulic valve 144. The hydraulic pressure acting on a lower surface of piston 138 actuates piston 138 from the disengaged position of mast lockout system 100, as depicted in FIG. 2A, to the engaged position of mast lockout system 100, depicted in FIG. 2B.

The actuation of piston 138 causes v-blocks 148a, 148b to move toward lock pins 124a, 124b. In the illustrated embodiment, as v-blocks 148a, 148b move toward lock pins 124a, 124b, each of radial bearings 126a, 126b contacts a surface of a respective v-block 148a, 148b. If there is any misalignment of radial bearings 126a, 126b relative to the center of v-blocks 148a, 148b, each of radial bearings 126a, 126b will contact and rotate against an angled surface of the respective v-block 148a, 148b causing mast 102 to rotate relative to upper case 108. This mast rotation precisely rotationally clocks the associated proprotor assembly such that each of the proprotor blades will be aligned with a slot 40 for folding. In embodiments that do not include radial bearings 126a, 126b, if there is any misalignment of lock pins 124a, 124b relative to the center of v-blocks 148a, 148b, each of lock pins 124a, 124b will contact and slide against an angled surface of the respective v-block 148a, 148b causing mast 102 to rotate relative to upper case 108. This mast rotation precisely rotationally clocks the associated proprotor assembly such that each of the proprotor blades will be aligned with a slot 40 for folding. In either implementation, once piston 138 is hydraulically actuated to shift mast lockout system 100 from the disengaged position (FIG. 2A) to the engaged position (FIG. 2B), rotation of the associated proprotor assembly is prevented as mast 102 is locked against rotation relative to upper case 108. When it is desired to transition aircraft 10 from the airplane forward flight mode back to the proprotor forward flight mode, hydraulic fluid enters upper chamber 140 via hydraulic valve 144 and exits lower chamber 142 via hydraulic valve 146. The hydraulic pressure acting on an upper surface of piston 138 actuates piston 138 from the engaged position of mast lockout system 100, as depicted in FIG. 2B, to the disengaged position of mast lockout system 100, depicted in FIG. 2A. Thereafter, the engines are reengaged with the proprotor assemblies returning aircraft 10 to the rotary flight mode.

Figure 3A:
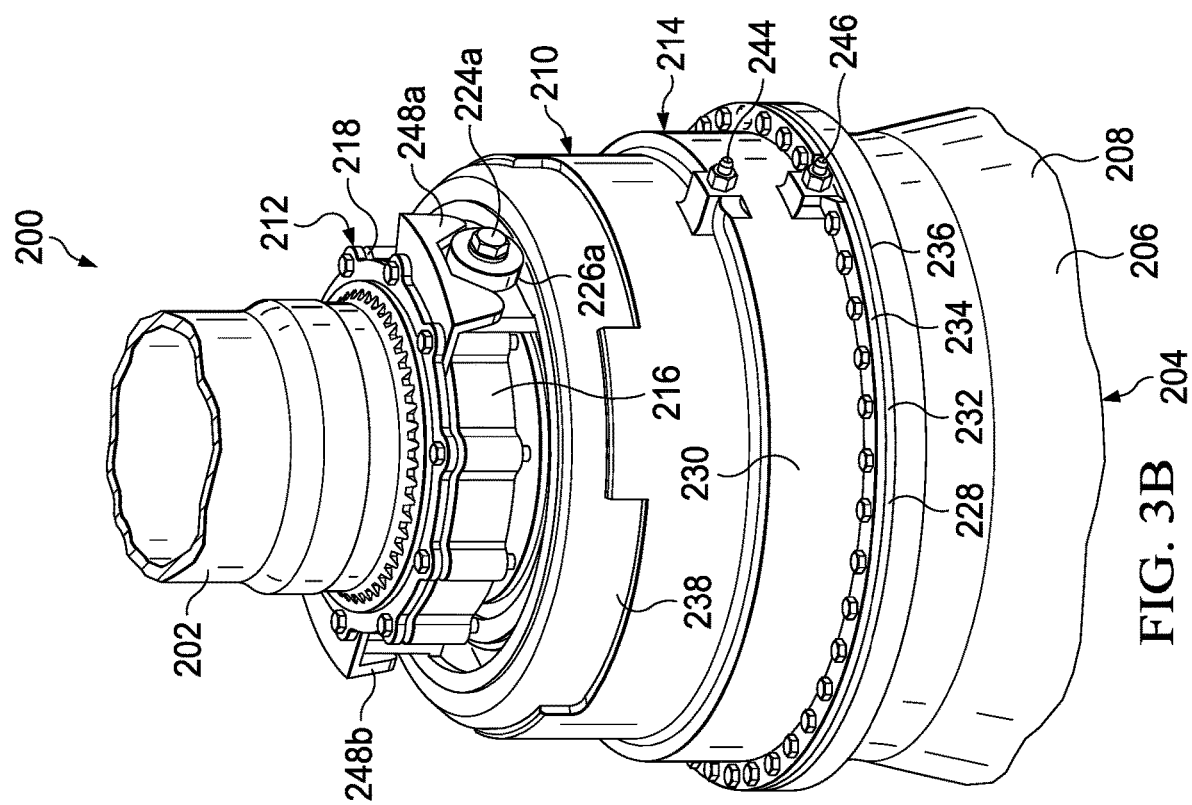
FIGS. 3A-3B are isometric views of a mast lockout system for a tiltrotor aircraft in disengaged and engaged positions in accordance with embodiments of the present disclosure.
Figure 3B:
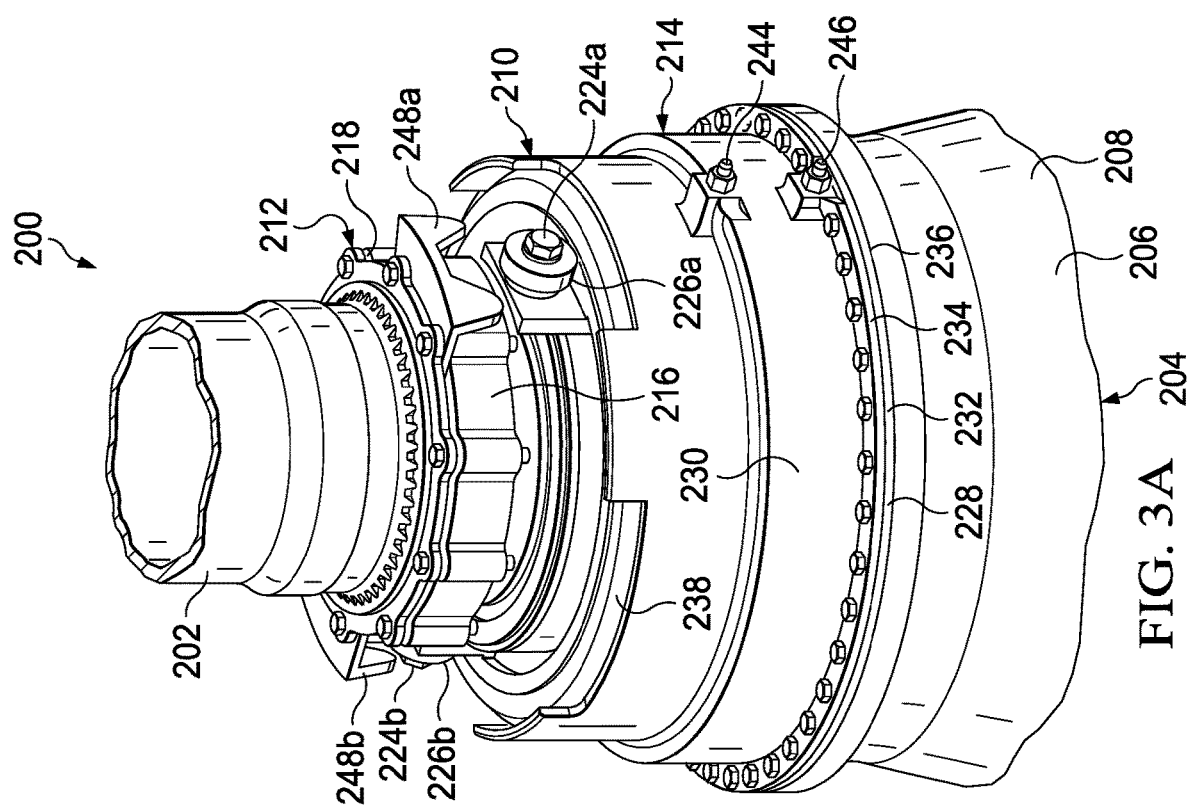

Referring to FIGS. 3A-3B of the drawings, a mast lockout system for a tiltrotor aircraft is generally designated 200. In the illustrated embodiment, mast lockout system 200 includes a mast 202 that receives torque and rotational energy from an engine, such as engines 26a, 26b, discussed herein, via a drivetrain including a proprotor gearbox 204. Proprotor gearbox 204 includes an outer housing 206 that is coupled to the airframe of aircraft 10. In the illustrated embodiment, the upper case 208 of outer housing 206 is depicted. Mast 202 supplies torque and rotational energy to a proprotor assembly, such as proprotor assemblies 20a, 20b discussed herein. As such, mast 202 rotates with the associated proprotor assembly. Mast lockout system 200 includes a lock assembly 210 having a rotating lock member 212 and a fixed lock member 214. Rotating lock member 212 includes a collar assembly 216 that is coupled to the exterior of mast 202. Collar assembly 216 is secured against axial movement relative to mast 202 by flange 218 that secures a ring within a groove of mast 202. Flange 218 and collar 216 are coupled to mast 202 at a splined connection to prevent relative rotation therebetween. Thus, rotating lock member 212 rotates with mast 202. In the illustrated embodiment, rotating lock member 212 includes two oppositely disposed v-blocks 248a, 248b.

Fixed lock member 214 includes a generally cylindrical inner piston housing 228 and a generally cylindrical outer piston housing 230. In the illustrated embodiment, inner piston housing 228 includes a flared portion 232 having a plurality of bolt holes. Likewise, outer piston housing 230 includes a flared portion 234 having a plurality of bolt holes. Inner piston housing 228 and outer piston housing 230 are secured to an upper surface 236 of upper case 208 by a plurality of bolts. A generally cylindrical piston 238 is at least partially disposed between inner piston housing 228 and outer piston housing 230. Piston 238 defines an upper chamber and a lower chamber with inner piston housing 228 and outer piston housing 230. At least one hydraulic valve 244 is in fluid communication with the upper chamber and at least one hydraulic valve 246 is in fluid communication with the lower chamber 242. In the illustrated embodiment, piston 238 has two oppositely disposed lock pins 224a, 224b that are threadably coupled thereto and extend radially outwardly therefrom. In the illustrated embodiment, optional radial bearings 226a, 226b are positioned on lock pins 224a, 224b, respectively. Radial bearings 226a, 226b are preferably radial ball bearing assemblies that have outer races that are operable for rotation about the respective lock pins 224a, 224b. Fixed lock member 214 includes a generally cylindrical guide (not visible) that is securably coupled to upper case 208 with a plurality of bolts. Piston 238 is coupled to the guide by a splined connection to prevent relative rotation therebetween. The splined connection, however, allows for axial movement of piston 238 relative to the guide.

The operation of mast lockout system 200 will now be described. When it is desired to transition aircraft 10 from the proprotor forward flight mode to the airplane forward flight mode, the engines are disengaged from the proprotor assemblies and the proprotor blades are feathered for aerodynamic braking. The brake system may then be engaged to fully stop the rotation of the proprotor assemblies. As discussed herein, the braking systems may incorporate position sensors to provide coarse rotational clocking of the proprotor blades. The coarse rotational clocking has a tolerance that is sufficient to circumferentially align lock pins 224a, 224b within the open ends of v-blocks 248a, 248b, as best seen in FIG. 3A, which represents the disengaged position of mast lockout system 200. When mast lockout system 200 is in the disengaged position, hydraulic fluid enters the lower chamber via hydraulic valve 246 and exits the upper chamber via hydraulic valve 244. The hydraulic pressure acting on a lower surface of piston 238 actuates piston 238 from the disengaged position of mast lockout system 200, as depicted in FIG. 3A, to the engaged position of mast lockout system 200, depicted in FIG. 3B.

The actuation of piston 238 causes lock pins 224a, 224b to move toward v-blocks 248a, 248b. In the illustrated embodiment, as lock pins 224a, 224b move toward v-blocks 248a, 248b, each of radial bearings 226a, 226b contacts a surface of a respective v-block 248a, 248b. If there is any misalignment of radial bearings 226a, 226b relative to the center of v-blocks 248a, 248b, each of radial bearings 226a, 226b will contact and rotate against an angled surface of the respective v-block 248a, 248b causing mast 202 to rotate relative to upper case 208. This mast rotation precisely rotationally clocks the associated proprotor assembly such that each of the proprotor blades will be aligned with a slot 40 for folding. In embodiments that do not include radial bearings 226a, 226b, if there is any misalignment of lock pins 224a, 224b relative to the center of v-blocks 248a, 248b, each of lock pins 224a, 224b will contact and slide against an angled surface of the respective v-block 248a, 248b causing mast 202 to rotate relative to upper case 208. This mast rotation precisely rotationally clocks the associated proprotor assembly such that each of the proprotor blades will be aligned with a slot 40 for folding. In either implementation, once piston 238 is hydraulically actuated to shift mast lockout system 200 from the disengaged position (FIG. 3A) to the engaged position (FIG. 3B), rotation of the associated proprotor assembly is prevented as mast 202 is locked against rotation relative to upper case 208. When it is desired to transition aircraft 10 from the airplane forward flight mode back to the proprotor forward flight mode, hydraulic fluid enters the upper chamber via hydraulic valve 244 and exits the lower chamber via hydraulic valve 246. The hydraulic pressure acting on an upper surface of piston 238 actuates piston 238 from the engaged position of mast lockout system 200, as depicted in FIG. 3B, to the disengaged position of mast lockout system 200, depicted in FIG. 3A. Thereafter, the engines are reengaged with the proprotor assemblies returning aircraft 10 to the rotary flight mode.

Figure 4A:
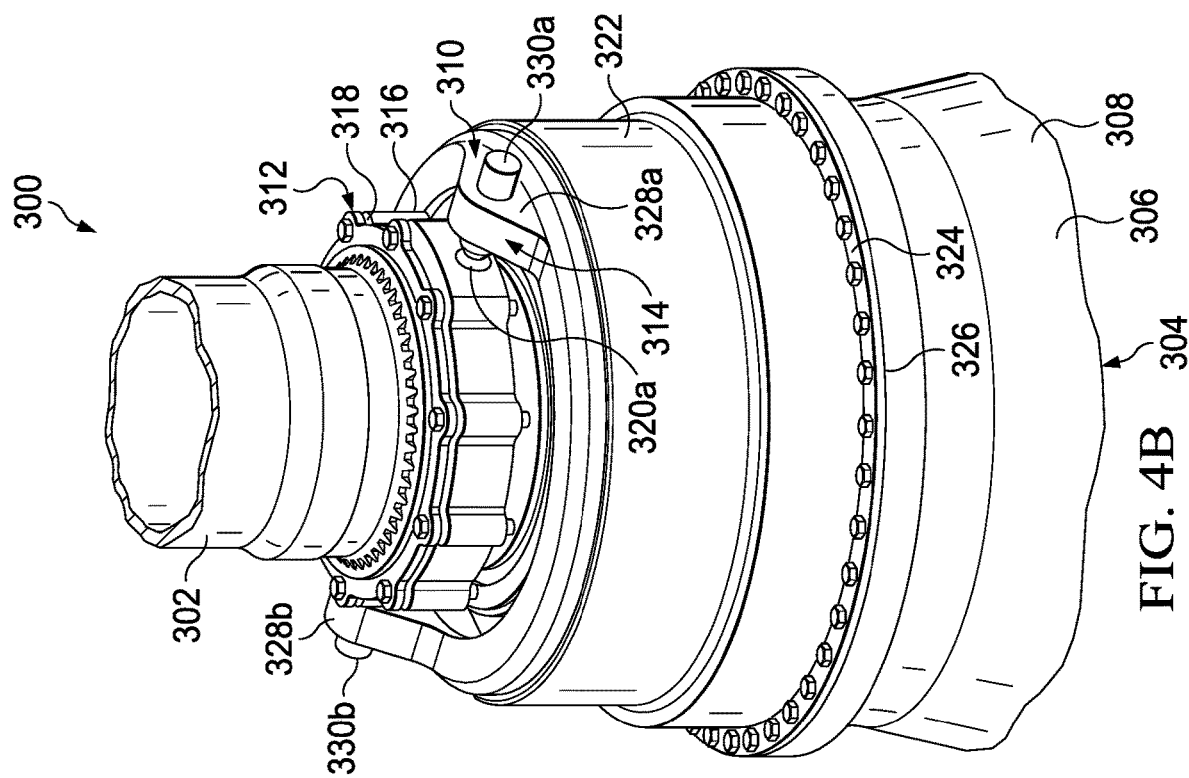
FIGS. 4A-4B are isometric views of a mast lockout system for a tiltrotor aircraft in disengaged and engaged positions in accordance with embodiments of the present disclosure.
Figure 4B:
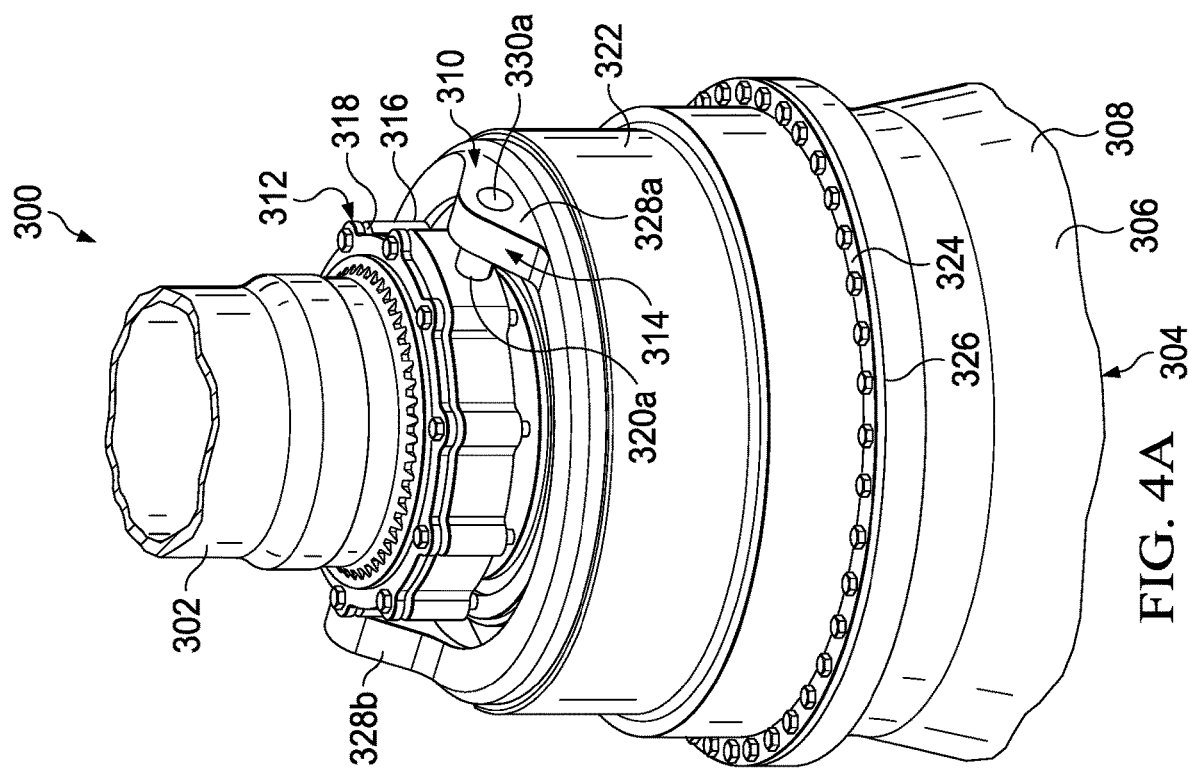

Referring to FIGS. 4A-4B of the drawings, a mast lockout system for a tiltrotor aircraft is generally designated 300. In the illustrated embodiment, mast lockout system 300 includes a mast 302 that receives torque and rotational energy from an engine, such as engines 26a, 26b, discussed herein, via a drivetrain including a proprotor gearbox 304. Proprotor gearbox 304 includes an outer housing 306 that is coupled to the airframe of aircraft 10. In the illustrated embodiment, the upper case 308 of outer housing 306 is depicted. Mast 302 supplies torque and rotational energy to a proprotor assembly, such as proprotor assemblies 20a, 20b discussed herein. As such, mast 302 rotates with the associated proprotor assembly. Mast lockout system 300 includes a lock assembly 310 having a rotating lock member 312 and a fixed lock member 314. Rotating lock member 312 includes a collar assembly 316 that is coupled to the exterior of mast 302. Collar assembly 316 is secured against axial movement relative to mast 302 by flange 318 that secures a ring within a groove of mast 302. Flange 318 and collar 316 are coupled to mast 302 at a splined connection to prevent relative rotation therebetween. Thus, rotating lock member 312 rotates with mast 302. In the illustrated embodiment, collar assembly 316 includes two oppositely disposed openings 320a, 320b, only opening 320a being visible in the figures. Fixed lock member 314 includes a generally cylindrical housing 322 that includes a flared portion 324 having a plurality of bolt holes. Housing 322 is secured to an upper surface 326 of upper case 308 by a plurality of bolts. In the illustrated embodiment, two oppositely disposed pin actuators 328a, 328b are supported by housing 322. Pin actuator 328a includes a tapered lock pin 330a. Pin actuator 328b includes a tapered lock pin 330b.

The operation of mast lockout system 300 will now be described. When it is desired to transition aircraft 10 from the proprotor forward flight mode to the airplane forward flight mode, the engines are disengaged from the proprotor assemblies and the proprotor blades are feathered for aerodynamic braking. The brake system may then be engaged to fully stop the rotation of the proprotor assemblies. As discussed herein, the braking systems may incorporate position sensors to provide coarse rotational clocking of the proprotor blades. The coarse rotational clocking has a tolerance that is sufficient to circumferentially align tapered lock pins 330a, 330b within openings 320a, 320b of collar assembly 316, as best seen in FIG. 4A, which represents the disengaged position of mast lockout system 300. When mast lockout system 300 is in the disengaged position, pin actuators 328a, 328b electrically or hydraulically shift tapered lock pins 330a, 330b radially inwardly into openings 320a, 320b of collar assembly 316 to the engaged position of mast lockout system 300, depicted in FIG. 4B. If there is any misalignment of tapered lock pins 330a, 330b and openings 320a, 320b of collar assembly 316, the interaction of the tapered surface of tapered lock pins 330a, 330b and openings 320a, 320b of collar assembly 316 will cause mast 302 to rotate relative to upper case 308. This mast rotation precisely rotationally clocks the associated proprotor assembly such that each of the proprotor blades will be aligned with a slot 40 for folding. Once tapered lock pins 330a, 330b are actuated to shift mast lockout system 300 from the disengaged position (FIG. 4A) to the engaged position (FIG. 4B), rotation of the associated proprotor assembly is prevented as mast 302 is locked against rotation relative to upper case 308. When it is desired to transition aircraft 10 from the airplane forward flight mode back to the proprotor forward flight mode, pin actuators 328a, 328b electrically or hydraulically shift tapered lock pins 330a, 330b radially outwardly out of openings 320a, 320b of collar assembly 316 from the engaged position of mast lockout system 300, as depicted in FIG. 4B, to the disengaged position of mast lockout system 300, depicted in FIG. 4A. Thereafter, the engines are reengaged with the proprotor assemblies returning aircraft 10 to the rotary flight mode.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A mast lockout system for a tiltrotor aircraft having a proprotor assembly, the system comprising:
    a mast coupled to and rotatable with the proprotor assembly;
    a proprotor gearbox having a proprotor gearbox housing, the proprotor gearbox operable to transmit torque and rotation energy to the mast; and
    a lock assembly having first and second lock members, the first lock member coupled to and rotatable with the mast, the second lock member coupled to the proprotor gearbox housing;
    wherein, the lock assembly has a first position in which the first and second lock members are disengaged, thereby allowing rotation of the proprotor assembly;
    wherein, the lock assembly has a second position in which the first and second lock members are engaged, thereby preventing rotation of the proprotor assembly; and
    wherein, the lock assembly is actuatable between the first and second positions.

2. The system as recited in claim 1 wherein the lock assembly further comprises a piston that is actuatable to shift the lock assembly between the first and second positions.

3. The system as recited in claim 2 wherein the piston further comprises a hydraulically actuated piston operable to shift the lock assembly between the first and second positions.

4. The system as recited in claim 1 wherein the first lock member is coupled to an exterior of the mast.

5. The system as recited in claim 1 wherein the first lock member is coupled to the mast by a splined connection to prevent relative rotation therebetween.

6. The system as recited in claim 1 wherein the first lock member further comprises a collar assembly that is coupled to the mast and at least one lock pin coupled to and radially outwardly extending from the collar assembly.

7. The system as recited in claim 6 further comprising a radial bearing coupled to the lock pin.

8. The system as recited in claim 6 wherein the at least one lock pin further comprises at least two oppositely disposed lock pins.

9. The system as recited in claim 8 further comprising a radial bearing coupled to each of the lock pins.

10. The system as recited in claim 1 wherein the second lock member is coupled to an exterior of the proprotor gearbox housing.

11. The system as recited in claim 1 wherein the second lock member further comprises a generally cylindrical inner piston housing and a generally cylindrical outer piston housing having a generally cylindrical piston disposed therebetween, the piston having at least one v-block operable to receive and align at least a portion of the first lock member therein.

12. The system as recited in claim 11 wherein the at least one v-block further comprises at least two oppositely disposed v-blocks each operable to receive and align at least a portion of the first lock member therein.

13. The system as recited in claim 11 further comprising a generally cylindrical guide coupled to the proprotor gearbox housing and disposed within the second lock member, the piston coupled to the guide by a splined connection to prevent relative rotation therebetween.

14. The system as recited in claim 11 wherein the piston defines first and second chambers with the inner and outer piston housings, the first and second chambers operable to receive and discharge a fluid to actuate the piston, thereby shifting the lock assembly between the first and second positions.

15. A mast lockout system for a tiltrotor aircraft having a proprotor assembly, the system comprising:
    a mast coupled to and rotatable with the proprotor assembly;
    a proprotor gearbox having a proprotor gearbox housing, the proprotor gearbox operable to transmit torque and rotation energy to the mast;
    a first lock member including a collar assembly rotatable with and coupled to an exterior of the mast and at least one lock pin radially outwardly extending therefrom; and
    a second lock member including a generally cylindrical inner piston housing and a generally cylindrical outer piston housing having a generally cylindrical piston disposed therebetween, the inner and outer piston housings coupled to an exterior of the proprotor gearbox housing, the piston having at least one v-block;
    wherein, the second lock member has a first position in which the first and second lock members are disengaged, thereby allowing rotation of the proprotor assembly;
    wherein, the second lock member has a second position in which the lock pin of the first lock member is received within and aligned by the v-block of the second lock member, thereby preventing rotation of the proprotor assembly; and
    wherein, the piston is hydraulically actuatable to shift the second lock member between the first and second positions.

16. The system as recited in claim 15 wherein the lock pin is operable to slide against the v-block as the second lock member engages the first lock member to rotationally clock the proprotor assembly.

17. The system as recited in claim 15 further comprising a radial bearing coupled to the lock pin, the radial bearing operable to rotate against the v-block as the second lock member engages the first lock member to rotationally clock the proprotor assembly.

18. The system as recited in claim 15 wherein the at least one lock pin further comprises at least two oppositely disposed lock pins and wherein the at least one v-block further comprises at least two oppositely disposed v-blocks each operable to receive and align one of the lock pins.

19. The system as recited in claim 18 further comprising a radial bearing coupled to each of the lock pins and wherein each of the radial bearings is operable to rotate against one of the v-blocks as the second lock member engages the first lock member to rotationally clock the proprotor assembly.

20. A tiltrotor aircraft having rotary and non rotary flight modes, in the rotary flight mode, the tiltrotor aircraft operating at least two proprotor assemblies each having a plurality of proprotor blades, in the non rotary flight mode, the proprotor assemblies are rotationally locked and rotationally clocked for folding of the proprotor blades, for each proprotor assembly the aircraft comprising:

a mast coupled to and rotatable with the proprotor assembly;

a proprotor gearbox having a proprotor gearbox housing, the proprotor gearbox operable to transmit torque and rotation energy to the mast; and a lock assembly having first and second lock members, the first lock member coupled to and rotatable with the mast, the second lock member coupled to the proprotor gearbox housing;

wherein, the lock assembly has a first position in which the first and second lock members are disengaged, thereby allowing rotation of the proprotor assembly;

wherein, the lock assembly has a second position in which the first and second lock members are engaged, thereby preventing rotation of the proprotor assembly; and wherein, the lock assembly is actuatable between the first and second positions.

\* \* \* \* \*